(12) United States Patent
Williams et al.

(10) Patent No.: US 12,179,705 B2
(45) Date of Patent: Dec. 31, 2024

(54) VEHICLES WITH SEAT ASSEMBLIES INCLUDING VEHICLE SEATS AND BACKPACKS

(71) Applicant: Toyota Motor Engineering & Manufacturing North America, Inc., Plano, TX (US)

(72) Inventors: Paxton S. Williams, Milan, MI (US); Scott L. Frederick, Brighton, MI (US); Colby Williams, Saline, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 199 days.

(21) Appl. No.: 17/883,194

(22) Filed: Aug. 8, 2022

(65) Prior Publication Data
US 2024/0042939 A1 Feb. 8, 2024

(51) Int. Cl.
*B60R 7/04* (2006.01)
*A45F 3/04* (2006.01)

(52) U.S. Cl.
CPC .............. *B60R 7/043* (2013.01); *A45F 3/04* (2013.01)

(58) Field of Classification Search
CPC .................. B60R 7/043; B60R 2011/0015
USPC .................. 224/275; 297/188.01, 188.04; 296/37.15, 37.16
See application file for complete search history.

(56) References Cited

U.S. PATENT DOCUMENTS

| | | | | |
|---|---|---|---|---|
| 5,950,895 A | * | 9/1999 | Zakarin | A45C 5/06 224/653 |
| 6,702,242 B1 | * | 3/2004 | Ziaylek, Jr. | A62B 25/00 297/188.05 |
| 8,191,848 B2 | * | 6/2012 | McLoughlin | A62B 25/00 297/188.04 |
| 8,459,735 B2 | * | 6/2013 | van Zyl | B60N 2/24 297/188.05 |
| 2008/0128464 A1 | * | 6/2008 | Gale | B60N 2/643 224/570 |
| 2010/0026065 A1 | * | 2/2010 | Butch | B60N 2/688 297/452.29 |
| 2016/0288723 A1 | | 10/2016 | Woodhouse et al. | |
| 2020/0298735 A1 | * | 9/2020 | Evans | B60N 2/2362 |

FOREIGN PATENT DOCUMENTS

| | | |
|---|---|---|
| CN | 206719109 U | 12/2017 |
| DE | 102007058269 A1 | 6/2009 |
| DE | 102009039471 A1 | 3/2011 |
| KR | 101599775 B1 | 2/2016 |
| KR | 102197673 B1 | 12/2020 |
| WO | 2020077618 A1 | 4/2020 |

* cited by examiner

*Primary Examiner* — Scott T McNurlen
(74) *Attorney, Agent, or Firm* — Dinsmore & Shohl LLP

(57) ABSTRACT

A vehicle includes a seat assembly includes a seat portion and a back portion connected to the seat portion. The back portion has an opening sized to receive a backpack that extends through both a front-facing surface and a rear-facing surface. A backpack is located in the opening in a stowed configuration. The backpack is accessible at the front-facing surface and the rear-facing surface and is removable from the opening.

12 Claims, 3 Drawing Sheets

VEHICLES WITH SEAT ASSEMBLIES INCLUDING VEHICLE SEATS AND BACKPACKS

TECHNICAL FIELD

The present specification generally relates to seat assemblies for vehicles and, more specifically, to seat assemblies for vehicles that include a seat and a backpack that forms a portion of the seat.

BACKGROUND

Passenger compartments of vehicles may be equipped with various storage compartments, such as trays or bins on vehicle doors, console storage compartments and glove boxes. However, access to and the versatility of the storage compartments may be limited.

Accordingly, there is a need for additional storage options.

SUMMARY

In accordance with one embodiment, a vehicle includes a seat assembly includes a seat portion and a back portion connected to the seat portion. The back portion has an opening sized to receive a backpack that extends through both a front-facing surface and a rear-facing surface. A backpack is located in the opening in a stowed configuration. The backpack is accessible at the front-facing surface and the rear-facing surface and is removable from the opening.

In another embodiment, a seat assembly includes a seat portion and a back portion connected to the seat portion. The back portion has an opening sized to receive a backpack that extends through both a front-facing surface and a rear-facing surface. A backpack is located in the opening in a stowed configuration. The backpack is accessible at the front-facing surface and the rear-facing surface and is removable from the opening.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a seat assembly including a combination vehicle seat and backpack. The vehicle seat includes a seat portion and a back portion. The back portion of the vehicle seat has an opening that extends through both a front-facing surface of the back portion and a rear-facing surface of the back portion. The backpack is located in the opening such that a strap side of the backpack is accessible at the front-facing surface of the back portion and a front pocket of the backpack is accessible at the rear-facing surface of the back portion.

Figure 1:
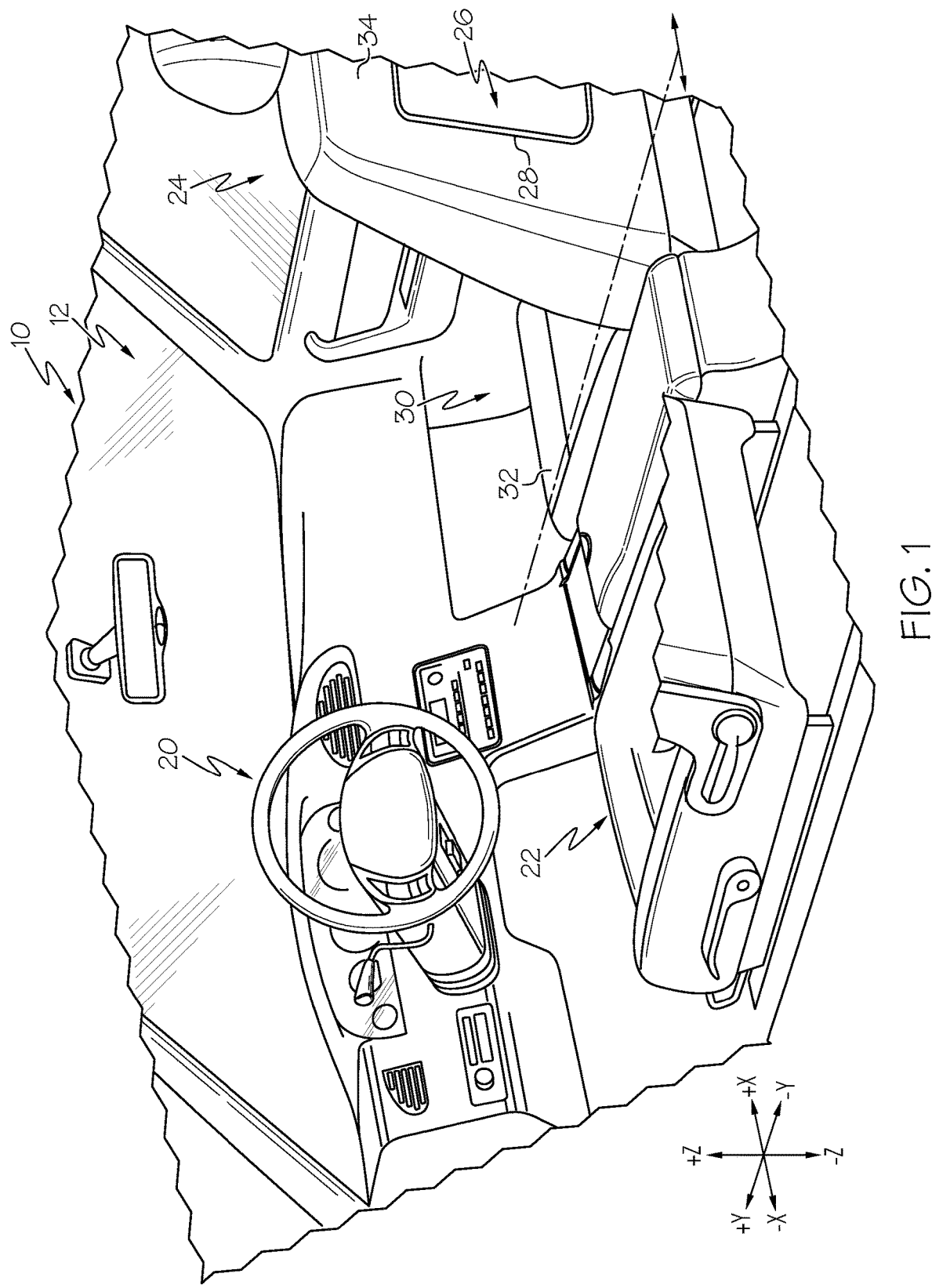
FIG. 1 depicts a partial perspective view of a passenger compartment for a vehicle including a seat assembly, according to one or more embodiments described and illustrated herein.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in direction 16 with respect to a vehicle centerline 14. The term "inboard" or "inward" as used herein refers to the relative location of a component in the direction opposite of "inboard" or "inward." Because the vehicle structures may be generally symmetrical about the vehicle centerline 14, the direction to which use of terms "inboard," "inward," "outboard" and "outward" refer may be mirrored about the vehicle centerline 14 when evaluating components positioned along opposite sides of the vehicle 10.

Referring to FIG. 1, a partial perspective view of a passenger compartment 12 of a vehicle 10 is depicted. The passenger compartment 12 includes a driver area and a passenger area. An instrument panel 20 is provided within the passenger compartment 12. The instrument panel 20 generally extends in the vehicle lateral direction and includes, among other things, an instrument cluster, a radio, and a climate control cluster including a plurality of individual vents. Further, the passenger compartment 12 includes a driver seat assembly 22 and a front passenger seat assembly 24. Located adjacent the driver seat assembly 22 are the controls to the vehicle 10 such as, among other things, a steering wheel, a gas pedal, and a brake pedal. It should be appreciated that the passenger compartment 12 may include a plurality of passenger seats rearward of the front passenger seat assembly 24 in the vehicle longitudinal direction.

One or more of the seat assemblies 22, 24 includes a backpack 26. As used herein, the term "backpack" refers to a bag with a shoulder strap that allows the bag to be carried on one's back. The backpack 26 is located within an opening 28 provided through vehicle seat 30. In particular, the vehicle seat 30 includes a seat portion 32 and a back portion 34. The opening 28 is provided through the back portion 34 with the backpack 26 filling the opening 28 in a stowed configuration.

Figure 2:
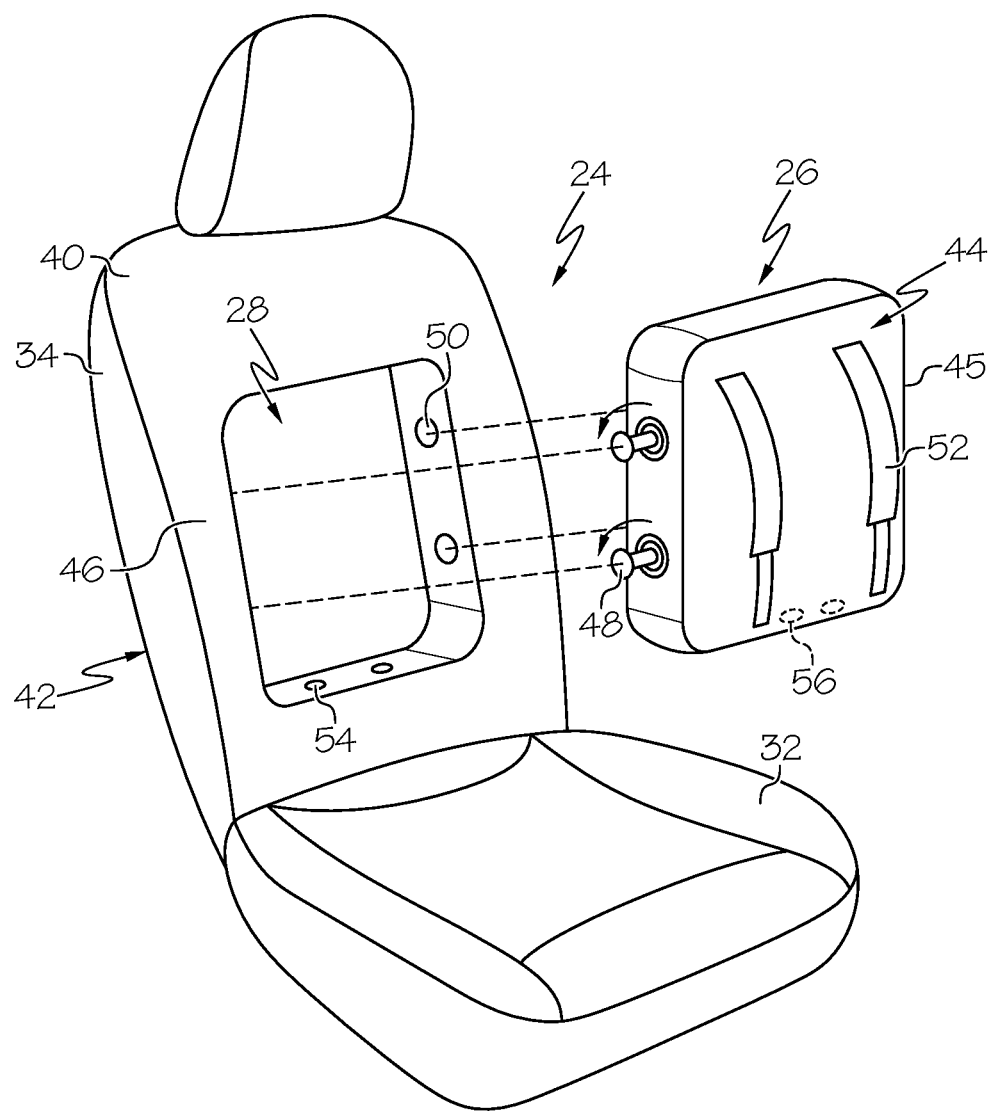
FIG. 2 depicts a front view of the seat assembly of FIG. 1 including a backpack, according to one or more embodiments shown and described herein.

Referring to FIG. 2, the seat assembly 24 is illustrated including the seat portion 32 and the back portion 34. In some embodiments, the back portion 34 may be connected to the seat portion 32 by a hinge, such that the back portion 34 can pivot forward and backward relative to the seat portion 32. The back portion 34 has the opening 28 that extends through both a front-facing surface 40 of the back portion 34 and a rear-facing surface 42 of the back portion 34. The backpack 26 is located in the opening 28 such that a strap side 44 of the backpack 26 is accessible at the front-facing surface 40 of the back portion 34.

The strap side 44 of the backpack 26 may be substantially flush with the front-facing surface 40 of the back portion 34 with the backpack 26 in the stowed configuration. Such an arrangement can provide a substantially continuous surface 46 over both the front-facing surface 40 and the strap side 44 of the backpack 26. A frame 45 of the backpack 26 can be rigid enough to support an occupant sitting in the seat assembly 24. The backpack 26 and the back portion 34 may include cooperating mating connections 48 and 50, such as rolling locks 48 that mate with latches 50 located on outboard sides of the backpack 26 and opening 28. The connections 48 and 50 may be provided at any suitable side of the opening 28 and the backpack 26. In some embodiments, the connections 48 and 50 may be arranged such that the backpack 26 can be locked in the stowed configuration in one orientation to avoid unintentionally locking the backpack 26 upside-down or backward. The connections 48 and 50 may be releasable in that they can be released from each other by applying a force to the backpack 26 (e.g., by pulling straps 52) that releases the connections 48 and 50. In other embodiments, a user input, such as a button, switch, etc. may be used to unlock the connections 48 and 50 to that the backpack 26 can be removed from the opening 28.

Electrical connections 54 may be provided in the opening 28 on a lower side or any other suitable side of the opening 28. For example, the electrical connections 54 may be charging ports including positive and negative connections for providing power (e.g., from the vehicle's battery). The electrical connections 54 may be configured to electrically connect to mating electrical connections 56 that are carried by the backpack 26. The electrical connections 56 can be, for example, connected to a personal computing device (e.g., smartphone, computer, tablet, etc.) for automatically charging the personal computing device once connected to the electrical connections 54. Any suitable connections can be provided, such as USB, including micro, mini and type-C USB, lightning, etc., also represented by elements 54.

Figure 3:
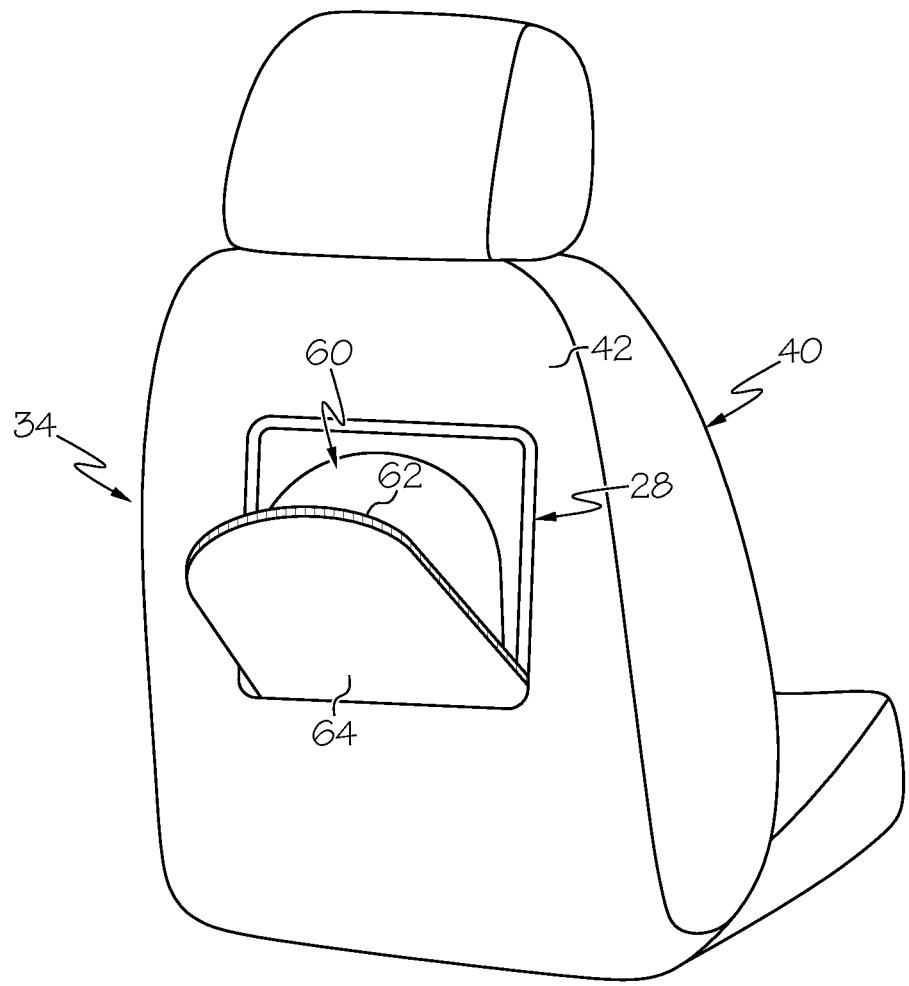
FIG. 3 depicts a rear view of the seat assembly of FIG. 2, according to one or more embodiments shown and described herein.

Referring to FIG. 3, as discussed above, the opening 28 extends through both the front-facing surface 40 of the back portion 34 (FIG. 2) and the rear-facing surface 42 of the back portion 34. In this regard, the backpack 26 can be accessed from both the front-facing surface 40 and the rear-facing surface 42. In some embodiments, the backpack 26 may include a front pocket 60. The front pocket 60 may include a closure, represented by element 62 (e.g., a zipper, hook and loop fastener, etc.), that can be accessed at the rear-facing surface 42 in the opening 28. A pocket flap 64 can then be opened to place or remove items from the front pocket 60. The pocket flap 64 may be sized and configured to be opened outward to extend beyond the rear-facing surface 42.

The above-described seat assemblies provide vehicle seats that can double as backpacks. The backpacks are accessible from both front-facing and rear-facing sides of the vehicle seats. Straps of the backpack can be accessed from the front-facing side and can be located to be placed around the occupant's shoulders so that the occupant can exit the vehicle with the backpack already on.

It is noted that the terms "substantially" and/or "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a seat assembly comprising:
   a seat portion;
   a back portion connected to the seat portion, wherein the back portion has an opening sized to receive a backpack that extends through both a front-facing surface and a rear-facing surface; and
   a backpack located in the opening in a stowed configuration, the backpack accessible at the front-facing surface and the rear-facing surface and being removable from the opening, the back portion comprising a first connection and the backpack comprising a second connection configured to mate with the first connection to secure the backpack in the stowed configuration.

2. The vehicle of claim 1, wherein a strap side of the backpack is accessible at the front-facing surface and a front pocket of the backpack is accessible at the rear-facing surface.

3. The vehicle of claim 1, wherein the backpack comprises a pocket flap arranged and configured to be opened at the rear-facing surface to provide access to the front pocket with the backpack in the stowed configuration.

4. The vehicle of claim 1, wherein the back portion comprises a first electrical connection located in the opening.

5. The vehicle of claim 4, wherein the backpack comprises a second electrical connection configured to electrically connect with the first electrical connection.

6. The vehicle of claim 1, wherein the seat assembly comprises a front passenger vehicle seat.

7. A seat assembly for a vehicle, comprising:
   a seat portion;
   a back portion connected to the seat portion, wherein the back portion has an opening sized to receive a backpack that extends through both a front-facing surface and a rear-facing surface; and
   a backpack located in the opening in a stowed configuration, the backpack accessible at the front-facing surface and the rear-facing surface and being removable from the opening, the back portion comprising a first connection and the backpack comprising a second connection configured to mate with the first connection to secure the backpack in the stowed configuration.

8. The seat assembly of claim 7, wherein a strap side of the backpack is accessible at the front-facing surface and a front pocket of the backpack is accessible at the rear-facing surface.

9. The seat assembly of claim 7, wherein the backpack comprises a pocket flap arranged and configured to be opened at the rear-facing surface to provide access to the front pocket with the backpack in the stowed configuration.

10. The seat assembly of claim 7, wherein the back portion comprises a first electrical connection located in the opening.

11. The seat assembly of claim 10, wherein the backpack comprises a second electrical connection configured to electrically connect with the first electrical connection.

12. The seat assembly of claim 7 comprising a front passenger vehicle seat.

\* \* \* \* \*

UNITED STATES PATENT AND TRADEMARK OFFICE
CERTIFICATE OF CORRECTION

| | | |
|---|---|---|
| PATENT NO. | : 12,179,705 B2 | Page 1 of 1 |
| APPLICATION NO. | : 17/883194 | |
| DATED | : December 31, 2024 | |
| INVENTOR(S) | : Paxton S. Williams, Scott L. Frederick and Colby Williams | |

It is certified that error appears in the above-identified patent and that said Letters Patent is hereby corrected as shown below:

On the Title Page

Item (73), assignee 2, city, delete "Toyota" and insert --Toyota-shi Aichi-ken--, therefor.

Signed and Sealed this
Twenty-second Day of April, 2025

Coke Morgan Stewart
*Acting Director of the United States Patent and Trademark Office*